United States Patent Office 3,555,056
Patented Jan. 12, 1971

3,555,056
NOVEL AMIDE AND A NOVEL DIACYL DERIVATIVE OF A TRIAZA ALKANE
Lamberto Crescentini, Chester, and Robert C. Wincklhofer, Richmond, Va., assignors to Allied Chemical Corporation, New York, N.Y., a corporation of New York
No Drawing. Filed Oct. 14, 1968, Ser. No. 767,489
Int. Cl. C07c 103/24; C09f 7/00
U.S. Cl. 260—404.5      2 Claims

ABSTRACT OF THE DISCLOSURE

A novel amide having the general formula:

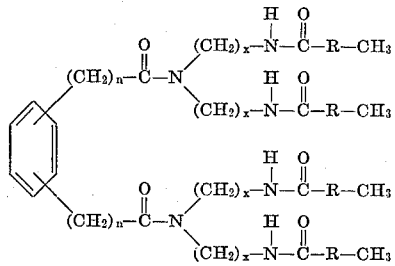

wherein the hexagon represents the benzene nucleus, R is a divalent radical containing up to about 30 carbon atoms which can be linear or branched aliphatic, n is an integer from 0 to about 6, x is an integer from 2 to about 6, and the

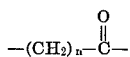

radicals connected to the benzene nucleus are relatively disposed in the ortho, meta, or para positions. The novel amide is prepared from a novel diacyl derivative of a triaza alkane having the general formula:

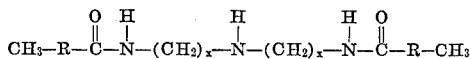

wherein R is a divalent radical containing up to about 30 carbon atoms which can be linear or branched aliphatic and x is an integer from 2 to about 6. These compounds are useful in increasing the soil resistance of synthetic fibers.

BACKGROUND OF THE INVENTION

This invention relates to a novel amide and to a novel diacyl derivative of a triaza alkane which is an intermediate in the preparation of the novel amide. In one specific aspect this invention relates to the isophthalamide of 1,7 di(n-octanoyl)1,4,7 triazaheptane and 1,7 di(n-octanoyl)1,4,7 triazaheptane which is an intermediate in the preparation of the above novel isophthalamide.

The soiling of synthetic fibers has always been a problem to the textile industry and various different chemical compounds have been used in the prior art to alleviate this problem. It has now been discovered that the novel amide of the present invention has great utility in increasing the soil resistance of a synthetic fiber and is advantageous over prior art soil resistance compounds in that a smaller quantity of the soil resistance additive is needed. In addition, the novel amide of the present invention does not interfere with fabric dyeing or dye lightfastness and the novel amide of the present invention does not change the luster of the synthetic fiber.

SUMMARY OF THE INVENTION

In accordance with the present invention, there has been prepared a novel amide having the general formula:

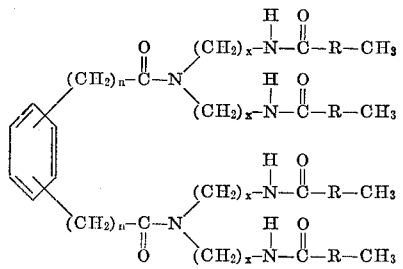

wherein the hexagon represents the benzene nucleus, R is a divalent hydrocarbon radical containing up to about 30, preferably about 3 to 18, carbon atoms which can be linear or branched aliphatic, n is an integer from 0 to about 6 but preferably is 0, x is an integer from 2 to about 6 but preferably about 2 to 3, and the

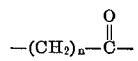

radicals connected to the benzene nucleus are relatively disposed in the ortho, meta, or para positions but preferably in the meta position. The novel amide of the present invention as described above is prepared by reacting a novel diacyl derivative of a triaza alkane which is also of the present invention and having the general formula:

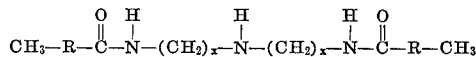

wherein R is a divalent radical containing up to about 30, preferably about 3 to 18, carbon atoms which can be linear or branched aliphatic and x is an integer from 1 to about 6 but preferably about 2 to 3 with a compound having the general formula:

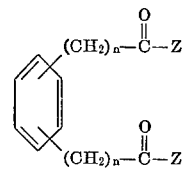

wherein the hexagon represents the benzene nucleus, n is an integer from 0 to about 6 but preferably is 0, Z is hydroxyl or OR″ wherein R″ is lower alkyl or Z is a halogen which can be chlorine, bromine, or iodine but preferably chlorine, and the

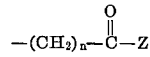

radicals are relatively disposed in the ortho, meta, or para positions but preferably in the meta position.

The novel amide of the present invention can be prepared by adding the novel diacyl derivative of a triaza alkane as described above to an aqueous solution of an alkali metal hydroxide, such as sodium or potassium hydroxide, and stirring the resulting mixture with vigorous agitation means such as a Waring Blendor, while gradually adding the compound having the general formula:

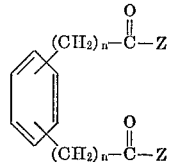

wherein $n$ and Z are defined above. The above compound can be dissolved in a suitable inert solvent such as chloroform or methylene chloride if desired. After the addition of the above compound is completed, the reaction mass is usually stirred for about 0.5 to 24 additional hours. Room temperature is generally sufficient for the reaction to proceed, however, higher temperatures may be employed when desired or necessary. The reaction can suitably be conducted at atmospheric pressure. Liquid is separated from the crude reaction product and is discarded. It is then desirable to wash the crude reaction product with water. The crude reaction product can then be purified by repeatedly dissolving it in and repeatedly crystallizing it from a suitable inert solvent such as acetonitrile until a product having a constant melting point is obtained.

The novel diacyl derivative of a triaza alkane of the present invention having the general formula:

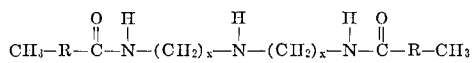

wherein R and $x$ as defined above can be prepared by charging into a flask, equipped with a stirrer and distillation condenser, a triaza alkane having the general formula:

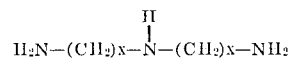

wherein $x$ is an integer from 2 to about 6 but preferably about 2 to 3 and a compound having the general formula:

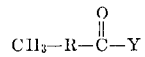

wherein R is a divalent radical containing up to about 30, preferably about 3 to 18, carbon atoms which can be linear or branched aliphatic, and Y is hydroxyl or —OR' wherein R' is lower alkyl, preferably lower alkyl containing about 1 to 4 carbon atoms, acyl containing up to about 31, preferably about 4 to 19, carbon atoms, or Y is a halogen which can be chlorine, bromine, or iodine but preferably chlorine. Generally speaking, the reaction temperature can range from about room temperature to about 300, preferably about 50 to 180° C. depending upon the reactants used. The reaction can suitably be conducted at atmospheric pressure, however, a vacuum is often useful and desirable in the last stage of the reaction to remove any undesirable volatile materials. The reaction can, in many cases, be conducted without a catalyst, however, in some cases a catalyst may be either necessary or desirable and the preferred catalysts are those of strong acids such as p-toluenesulfonic acid, benzene sulfonic acid, sulfuric acid, phosphoric acid and the like. The amount of catalyst when used is a catalytic amount, say about 0.01 to 1 wt. percent based on the weight of the triaza alkane. When a volatile by-product is evolved from the reaction mass, such as an alcohol or water, it can be condensed in the distillation column and removed from the reaction mass. Similarly, when a hydrohalic acid is evolved from the reaction mass, it can be cooled in the distillation column, removed from the reaction mass and subsequently collected in a neutralizing medium or water.

Suitable triaza alkane reactants for producing the novel diacyl derivative of a triaza alkane of the present invention include 1,4,7 triazaheptane; 1,5,8 triazaoctane; 1,5,9 triazanonane; 1,8,15 triazapentadecane; and 1,4,11 triazaundecane. Suitable reactants for producing the novel diacyl derivative of a triaza alkane of the present invention having the general formula:

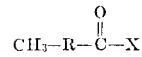

wherein R and Y are defined above include iso-propyl octacosanoate, methyl octanoate, methyl 2-methylpentanoate, ethyl stearate, butyric anhydride, lauric acid, and palmitoyl chloride.

Typical diacyl derivatives of a triaza alkane of the present invention include 1,9 dilauroyl 1,5,9 triazanonane; 1,7 di(n-octanoyl)1,4,7 triazaheptane; 1,13 dipentanoyl 1,7,13 triazatridecane; and 1,7 distearoyl 1,4,7 triazaheptane.

Suitable reactants having the general formula:

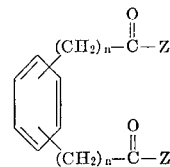

wherein $n$ and Z are defined above which will react with the typical diacyl derivatives of a triaza alkane of the present invention as illustrated above to produce the novel amide of the present invention include dimethyl isophthalate; 1,3 dicarboxymethyl benzene; isophthaloyl chloride; terephthaloyl chloride; ortho phthaloyl chloride; and 3 carboxyethyl benzoic acid.

Typical novel amides of the present invention include the isophthalamide of 1,7 dioctanoyl 1,4,7 triazaheptane; the terephthalamide of 1,9 dilauroyl 1,5,9 triazanonane; and the isophthalamide of 1,7 distearoyl 1,4,7 triazaheptane.

The novel amide of the present invention can be incorporated into the synthetic polymer during the polymerization or can be dry blended with the synthetic polymer granules prior to the melting of the polymer by conventional addition and dry mixing procedures. The novel amide of the present invention can also be incorporated into the molten polymer by, for example, injection into the mixing portion of the extruder during the melt extrusion of the filament.

PREFERRED EMBODIMENTS

The following examples illustrate the practice and principles of this invention and a mode of carrying out the invention.

Example I 1,7 di(n-octanoyl)1,4,7 triazaheptane as represented by the formula:

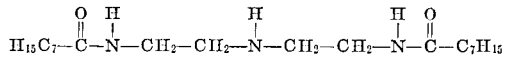

was prepared by charging 276 grams of methyl octanoate, 90 grams of 1,4,7 triazaheptane (diethylenetriamine) and 0.1 gram of p-toluenesulfonic acid into a flask equipped with a stirrer and distillation condenser. The temperature was raised gradually to 170° C. and methanol was evolved during the raising of temperature. When the evolution of methanol subsided, the reaction mass was allowed to cool to room temperature. The reaction product, crude 1,7 di(n-octanoyl)1,4,7-triazaheptane, was repeatedly dissolved in and repeatedly crystallized from benzene until a constant melting point of 103° C. was obtained. The purified compound was analyzed and was found to contain the following:

*Analysis.*—Theoretical calculated as $C_{20}H_{41}N_3O_2$ (percent): C, 67.56; H, 11.62; N, 11.82. Actual (percent): C, 67.8; H, 11.6; N, 11.6.

Example II

The isophthalamide of 1,7 di(n-octanoyl)1,4,7 triazaheptane as represented by the formula:

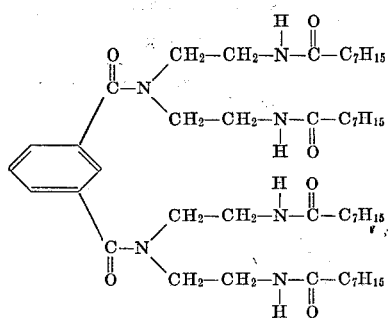

was prepared by placing 100 grams of 1,7 di(n-octanoyl) 1,4,7-triazaheptane as prepared in Example I and a solution of 18.2 grams of potassium hydroxide in 350 ml. of water into a Waring Blendor. The blender was started and 31.4 grams of isophthaloyl chloride were gradually added. After the addition of the isophthaloyl chloride was completed, the reaction mass was stirred for three additional hours. Liquid was separated from the crude reaction product and discarded. The crude reaction product was repeatedly washed in the blender with water. A white, solid material was obtained which was repeatedly dissolved in and repeatedly crystallized from acetonitrile until a constant melting point of 80° C. was obtained. The purified compound was analyzed and was found to contain the following:

*Analysis.*—Theoretical calculated as $C_{48}H_{84}N_6O_6$ (percent): C, 68.53; H, 10.07; N, 9.99. Actual (percent): C, 68.3; H, 10.6; N, 10.1.

Example III

Synthetic multifilament yarn was produced in the following manner. 0.5 weight percent of the isophthalamide of 1,7 di(n-octanoyl)-1,4,7-triazaheptane prepared in Example II was added to nylon 6 (polycaproamide) pellets or granules and the mixture was blended in a double cone blender for one hour. The granular blend was then melted at 260° C. and melt extruded under a pressure of 3,000 p.s.i.g. through a 14-orifice spinnerette, each of the orifices having a diameter of $28/_{1000}$ inch, to produce a 840 denier yarn. The yarn was collected at about 800 feet per minute and was drawn about 4 times its extruded length to produce a 210 denier yarn. The yarn had a relative viscosity of 55, as determined at a concentration of 11 grams of polymer in 100 ml. of 90 percent formic acid at 25° C. (ASTM D-789-62T), and a tenacity of 3.8 grams per denier. The yarn was texturized and a carpet sample was prepared. The carpet sample was then mock-dyed and tested for soiling at ambient temperature and 15–20 percent relative humidity. The apparent soiling, $\Delta(K/S)$, of the carpet sample was calculated according to the Kubelka-Munk equation:

$$\frac{K}{S} = \frac{(1-R)^2}{2R}$$

wherein:

K=light absorption coefficient
S=light scattering coefficient
R=reflectance and was found to be 1.27 as compared to a $\Delta(K/S)$ value of 1.49 for a carpet of nylon 6 yarn produced under the same conditions but containing none of the isophthalamide of 1,7 di(n-octanoyl)1,4,7-triazaheptane prepared in Example II. The Accelerated Soiling Test as stated above measures the variation in reflectance before and after soiling. In the Accelerated Soiling Test, carpet samples are mounted on the periphery of a drum, tumbled with felt cubes loaded with artificial soil for 30 minutes, removed from the drum, and measured for reflectance on a Hunter Color Difference Meter.

Example IV

Synthetic multifilament yarn was produced in the same manner as in Example III except that 1.0 weight percent of the isophthalamide of 1,7 di(n-octanoyl)-1,4,7-triazaheptane prepared in Example II was blended with the nylon 6 (polycaproamide) pellets or granules. The resulting 210 denier yarn was processed into a mock-dyed carpet sample in the same manner as in Example III. The apparent soiling $\Delta(K/S)$ was calculated and was found to be 1.29 as compared to a $\Delta(K/S)$ value of 1.49 for a carpet of nylon 6 yarn produced under the same conditions but containing none of the isophthalamide of 1,7 di(n-octanoyl) 1,4,7 triazaheptane prepared in Example II. The data contained in Examples III and IV clearly indicate that the incorporation of the isophthalamide of 1,7 di(n-octanoyl) 1,4,7 triazaheptane as prepared in Example II in nylon 6 (polycaproamide) significantly improves the soil resistance of carpets of nylon 6.

It is claimed:

1. The amide of the general formula:

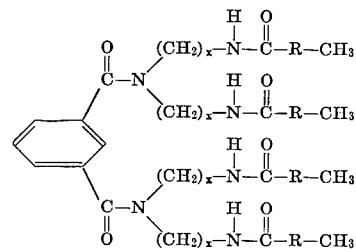

wherein R is a divalent hydrocarbon radical containing about 3 to 18 carbon atoms selected from the group consisting of linear and branched aliphatic, and x is an integer from about 2 to 3.

2. The novel isophthalamide of 1,7 di(n-octanoyl) 1,4,7 triazaheptane as represented by the formula:

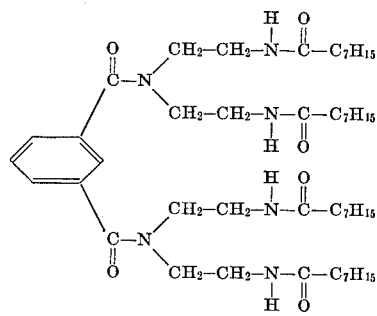

References Cited

UNITED STATES PATENTS

| | | | |
|---|---|---|---|
| 2,933,409 | 4/1950 | Binkley et al. | 117—11 |
| 2,936,251 | 5/1960 | Garceau et al. | 117—139.5 |
| 2,972,548 | 2/1961 | Musser | 260—404.5 |
| 3,038,820 | 6/1962 | Albrecht | 117—139.5 |
| 3,288,794 | 11/1966 | Kuceski | 260—268 |
| 3,326,826 | 6/1967 | Cohen | 260—23 |
| 3,337,624 | 8/1967 | Hoch | 260—558 |

(Other references on following page)

FOREIGN PATENTS 538,608   8/1941   Great Britain _____ 260—404.5

OTHER REFERENCES

Albrecht II, "Softening of cellulose triacetate fibers" (1965) CA 64 pp. 3755–56 (1966).

Gen. Mills Inc. "Antistatic α-olefin polymers" (1965) CA 64 p. 8415 (1966).

Caldwell et al., "Polyesters with improved dyeing props." (1966) CA 66 p. 6296, No. 66642e. (1967).

LEWIS GOTTS, Primary Examiner

G. HOLLRAH, Assistant Examiner

U.S. Cl. X.R.

8—17; 57—140; 117—138.8, 139.5; 161—168, 172; 260—78, 558, 561; 264—211